United States Patent
Xiao et al.

(10) Patent No.: US 11,324,059 B2
(45) Date of Patent: May 3, 2022

(54) RADIO CONFIGURATION METHOD, USER EQUIPMENT, AND BASE STATION

(71) Applicants: SHARP KABUSHIKI KAISHA, Sakai (JP); FG INNOVATION COMPANY LIMITED, Tuen Mun (HK)

(72) Inventors: Fancying Xiao, Shanghai (CN); Chongming Zhang, Shanghai (CN); Renmao Liu, Shanghai (CN); Shohei Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 27 days.

(21) Appl. No.: 16/496,054

(22) PCT Filed: Mar. 16, 2018

(86) PCT No.: PCT/CN2018/079226
§ 371 (c)(1),
(2) Date: Sep. 20, 2019

(87) PCT Pub. No.: WO2018/171512
PCT Pub. Date: Sep. 27, 2018

(65) Prior Publication Data
US 2020/0029379 A1  Jan. 23, 2020

(30) Foreign Application Priority Data
Mar. 23, 2017 (CN) .......................... 201710180714.9

(51) Int. Cl.
*H04W 76/15* (2018.01)
*H04L 12/24* (2006.01)
(Continued)

(52) U.S. Cl.
CPC ......... *H04W 76/15* (2018.02); *H04L 41/0806* (2013.01); *H04W 76/27* (2018.02)

(58) Field of Classification Search
CPC ......... H04L 1/22; H04L 1/08; H04L 41/0806; H04W 28/065; H04W 76/15; H04W 76/34; H04W 76/27
See application file for complete search history.

(56) References Cited

U.S. PATENT DOCUMENTS

2018/0092118 A1 * 3/2018 Kim .................. H04W 72/1205
2018/0098250 A1 * 4/2018 Vrzic .................... H04W 36/18
(Continued)

FOREIGN PATENT DOCUMENTS

CN   106211352 A   12/2016
CN   107342851 A   11/2017

OTHER PUBLICATIONS

NTT Docomo: New SID Proposal: Study on New Radio Access Technology; Discussion; 9.1; RP-160671; 3GPP TSG RAN Meeting #71; Goteborg, Sweden, Mar. 7-10, 2016.
(Continued)

*Primary Examiner* — Maharishi V Khirodhar
*Assistant Examiner* — Kenneth P Hunt
(74) *Attorney, Agent, or Firm* — ScienBiziP, P.C.

(57) ABSTRACT

The present application provides a method executed by user equipment (UE), comprising: receiving radio resource control (RRC) signaling, the RRC signaling comprising configuration information used for configuring, for the UE, a data radio bearer (DRB) supporting packet duplication; establishing a corresponding DRB according to the configuration information; and calculating transmittable data of a packet data convergence protocol (PDCP) entity for a logical channel corresponding to the established DRB. The present application also provides corresponding UE, a base (Continued)

station, and a corresponding method executed by a base station.

8 Claims, 8 Drawing Sheets

(51) Int. Cl.
*H04W 76/27* (2018.01)
*H04L 41/0806* (2022.01)

(56) References Cited

U.S. PATENT DOCUMENTS

| | | | |
|---|---|---|---|
| 2019/0053325 A1* | 2/2019 | Yu | H04W 76/32 |
| 2019/0215717 A1* | 7/2019 | Lee | H04W 80/08 |
| 2020/0128596 A1* | 4/2020 | Yi | H04W 76/15 |
| 2020/0267793 A1* | 8/2020 | Sharma | H04W 76/19 |

OTHER PUBLICATIONS

Intel Corporation: Packet duplication for URLLC within a gNB; Discussion and Decision; 10.2.1.2; R2-1701720; 3GPP TSG-RAN WG2 97 meeting; Athens, Greece, Feb. 13-17, 2017.

* cited by examiner

RADIO CONFIGURATION METHOD, USER EQUIPMENT, AND BASE STATION

TECHNICAL FIELD

The present disclosure relates to the radio communication technology field. More specifically, the present disclosure relates to a radio configuration method, user equipment, and a base station.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

In the 3GPP RAN2 #96 meeting held in October 2016, it was agreed that research will be performed on multi-connection (including dual-connection) so as to satisfy the reliability requirement of the URLLC. The aforementioned multi-connection can adopt mechanisms such as packet duplication or link selection. In the 3GPP NR AdHoc meeting held in January 2017, it was agreed that an NR-PDCP entity would support a packet duplication function of a user plane and a data plane, where the function of a PDCP entity at a transmission end would support packet duplication, and the function of a PDCP entity at a receiving end would support packet deduplication. In the 3GPP RAN2 #97 meeting held in February 2017, it was agreed that both uplink and downlink would support the following in carrier aggregation: packet duplication uses a PDCP PDU and/or SDU for transmission on a plurality of logical channels and causes duplicate PDCP PDUs to be transmitted through different carriers.

SUMMARY

The main problems to be solved by the present application are as follows: in a multi-connection scenario and a carrier aggregation scenario in which packet duplication is supported, how to enable a base station to configure a packet duplication DRB for user equipment (UE) and how to enable user equipment to calculate data to be transmitted by a PDCP entity.

According to one aspect of the present invention, a method executed by user equipment (UE) is provided, comprising: receiving radio resource control (RRC) signaling, the RRC signaling comprising configuration information used for configuring, for the UE, a data radio bearer (DRB) supporting packet duplication; and establishing a corresponding DRB according to the configuration information.

In one embodiment, the method further comprises calculating and reporting transmittable data of a packet data convergence protocol (PDCP) entity for a logical channel corresponding to the established DRB.

In one embodiment, the configuration information comprises: two or a plurality of logical channel identities for the packet duplication DRB; or a logical channel identity for the packet duplication DRB and an indicator for the packet duplication DRB.

In one embodiment, the establishing a corresponding DRB according to the configuration information comprises: establishing and configuring a PDCP entity and configuring the PDCP entity to deactivate a packet duplication function; establishing and configuring a radio link control (RLC) entity; and establishing and configuring a logical channel.

In one embodiment, the calculating and reporting transmittable data of a PDCP entity comprises: when a medium access control (MAC) entity triggers a buffer status report (BSR) and calculates a buffer size, indicating the transmittable data of a PDCP entity to two or a plurality of logical channels associated with the packet duplication DRB.

In one embodiment, a logical channel group identity corresponding to the packet duplication DRB is predefined; or a logical channel group identity corresponding to the packet duplication DRB is comprised in the configuration information.

In one embodiment, the calculating and reporting transmittable data of a PDCP entity comprises: indicating the transmittable data of a PDCP entity to a MAC entity configured for a secondary cell group (SCG) and a MAC entity configured for a master cell group (MCG).

According to another aspect of the present invention, user equipment (UE) is provided, comprising a processor and a memory. The memory has instructions stored thereon. The instructions, when processed by the processor, execute the method described above.

According to another aspect of the present invention, a method executed by a base station is provided, comprising: configuring radio resource control (RRC) signaling, the RRC signaling comprising configuration information used for configuring, for user equipment (UE), a data radio bearer (DRB) supporting packet duplication; and transmitting the RRC signaling to the UE.

According to another aspect of the present invention, a base station is provided, comprising a processor and a memory. The memory has instructions stored thereon. The instructions, when processed by the processor, execute the method described above.

BRIEF DESCRIPTION OF DRAWINGS

The above and other features of the present application will become more apparent through the following detailed description made in conjunction with the accompanying drawings, where.

DETAILED DESCRIPTION

Figure 1:
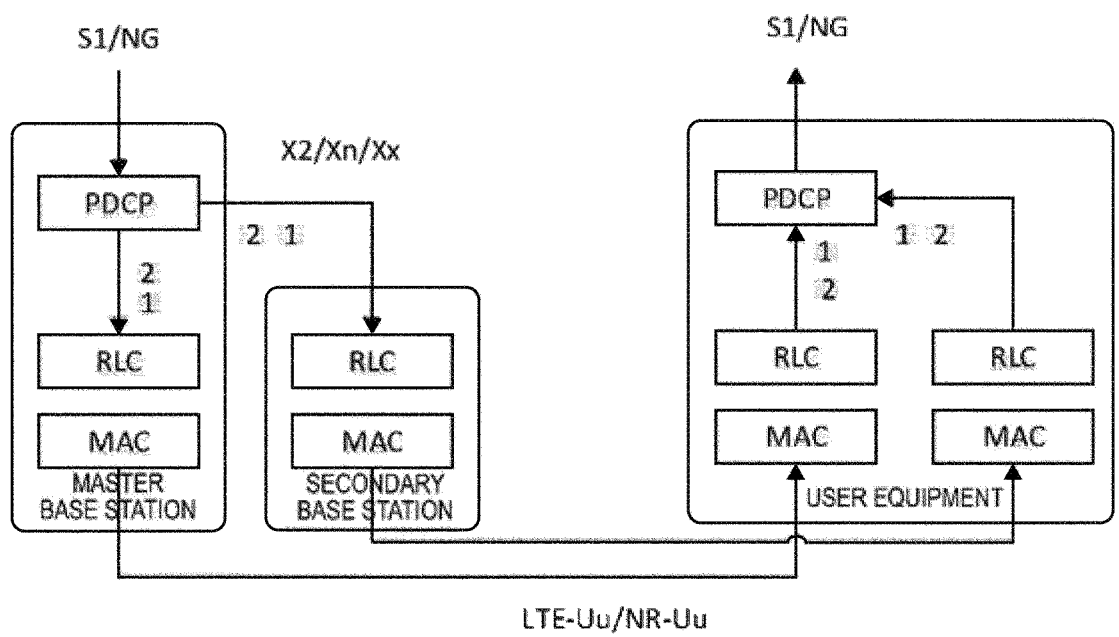
FIG. 1 is a schematic diagram of data transmission of a packet duplication MCG split DRB according to an embodiment of the present application.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are first described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may represent a PDCP in NR or LTE or eLTE.

RLC: Radio Link Control. In the present disclosure, if not specifically indicated, the RLC may represent RLC in NR or LTE or eLTE.

MAC: Medium Access Control. In the present disclosure, if not specifically indicated, the MAC may represent MAC in NR or LTE or eLTE.

DTCH: Dedicated Traffic Channel.

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; and data received from or transmitted to an RLC entity by the PDCP entity is referred to as a PDCP PDU (i.e., an RLC SDU).

Master Base Station: Master eNB, denoted as MeNB (a base station corresponding to E-UTRAN or Long Term Evolution (LTE) or eLTE) or MgNB (a base station corresponding to 5G-RAN or NR), which refers to a base station in multi-connection that, in multi-connection, at least terminates at a control node mobility management entity (which may be denoted as S1-MME) for processing interaction between UE and a core network in multi-connection. In the present disclosure, master base stations are all denoted as MeNBs. It should be noted that all schemes or definitions applicable to the MeNB are also applicable to the MgNB.

Secondary Base Station: Secondary eNB, denoted as SeNB (a base station corresponding to E-UTRAN or LTE or eLTE) or SgNB (a base station corresponding to 5G-RAN or NR), which refers to a base station in multi-connection that provides additional radio resources for UE but does not serve as an MeNB. In the present disclosure, secondary base stations are all denoted as SeNBs. It should be noted that all schemes or definitions applicable to the SeNB are also applicable to the SgNB.

Primary Cell: Primary Cell (PCell). The PCell is a cell that operates on the primary frequency, and is a cell on which UE performs an initial connection establishment procedure or initiates a connection reestablishment procedure or which is designated as a primary cell during a handover procedure.

Primary Secondary Cell: PSCell, which refers to an SCG cell used to instruct UE to perform a random access when performing the SCG change procedure.

Secondary Cell: SCell, which refers to a cell operating on a secondary frequency. The cell can be configured once an RRC connection is established and can be used to provide additional radio resources.

Cell Group: CG. The CG is a group of serving cells in multi-connection and is associated with a master base station or a secondary base station. It should be noted that the cell in the present disclosure may also be referred to as a set of beams.

Master Cell Group: MCG. For UE not configured with multi-connection, the MCG comprises all serving cells; for UE configured with multi-connection, the MCG comprises a subset of serving cells (i.e., a group of serving cells associated with an MeNB or an MgNB) including a PCell and 0, 1, or a plurality of SCells.

Secondary Cell Group: SCG. The SCG is a group of serving cells associated with an SeNB or SgNB in multi-connection. The SCG may include one PSCell, and may also include one or a plurality of SCells.

Multi-connection: an operation mode of UE in an RRC connected state. In the multi-connection, multiple cell groups are configured, and the multiple cell groups comprise one MCG and one or a plurality of SCGs (namely, the UE is connected to multiple base stations). If only one MCG (or MeNB or MgNB) and one SCG (or SeNB or SgNB) are configured, the multi-connection is referred to as dual-connection. Namely, the UE being in the connected state and having multiple receivers and/or transmitters is configured to use EUTRAN and/or 5G-RAN radio resources provided by multiple different schedulers; the schedulers may be connected by non-ideal backhaul or ideal backhaul. The multi-connection in the present disclosure includes dual-connection. Multi-connection data transmission modes comprise, but are not limited to, packet duplication and link selection.

BSR: Buffer Status Report. The BSR is used for providing a serving base station with information about the amount of data to be transmitted in an uplink buffer corresponding to an associated MAC entity.

DRB: Data Radio Bearer carrying user plane data, or referred to as a data bearer for short.

Split DRB: a bearer of which a wireless protocol is located in an MeNB (or MgNB) and an SeNB (or SgNB) and which uses resources of both the MeNB (or MgNB) and the SeNB (or SgNB) in multi-connection. If a PDCP entity of the split DRB is located in a master base station (namely, data arrives at the master base station first and is forwarded by the master base station to a secondary base station to split the data in the master base station), the split DRB is referred to as an MCG split DRB; if a PDCP entity of the split DRB is located in a secondary base station (namely, data arrives at the secondary base station first and is forwarded by the secondary base station to a master base station to split the data in the secondary base station), the split DRB is referred to as an SCG split DRB. If not specifically indicated, the split DRB in the present disclosure may be an MCG split DRB or an SCG split DRB.

SRB: Signaling Radio Bearer. The bearer may be used for transmitting an RRC message and a NAS message or for transmitting only an RRC message and a NAS message. The SRB may comprise SRB0, SRB1, SRB1bis, and SRB2. SRB0 is used for an RRC message using a CCCH logical channel; SRB1 is used for an RRC message using a DCCH logical channel, where the RRC message may include a NAS message; SRB1 is also used for transmitting a NAS message before SRB2 is established. SRBbis is used for RRC messages and NAS messages adopting DCCH logical channels prior to secure activation, where the RRC messages may comprise the NAS messages. SRB2 is used for an RRC message and a NAS message using a DCCH logical channel, where the RRC message comprises recorded measurement information (or referred to as a measurement log).

Split SRB: a bearer in which a wireless protocol is located in an MeNB (or MgNB) and an SeNB (or SgNB) and which uses resources of both the MeNB (or MgNB) and the SeNB (or SgNB) in multi-connection. If a PDCP entity and/or RRC of the split SRB is located in a master base station (namely, signaling of the master base station is forwarded to a secondary base station to split the signaling in the master base station), the split SRB is referred to as an MCG split SRB; if a PDCP entity and/or RRC of the split SRB is located in a secondary base station (namely, signaling of the secondary base station is forwarded by the secondary base station to a master base station to split the signaling in the secondary base station), the split SRB is referred to as an SCG split SRB. If not specifically indicated, the split SRB in the present invention may be an MCG split SRB or an SCG split SRB.

In the present invention, the split bearer may be a split SRB or a split DRB. The MCG split bearer may be an MCG split SRB or an MCG split DRB. The SCG split bearer may be an SCG split SRB or an SCG split DRB.

Packet Duplication: it can also be called data duplication. In a multi-connection mode, the same data (or referred to as a packet, namely a PDCP PDU or PDCP SDU) is transmitted in serving cells of multiple CGs, namely, the same data is transmitted on multiple different bearers (for example, data bearer DRB or signaling bearer SRB) or the same data is transmitted by using resources provided by both a master base station (or an MCG) and a secondary base station (or an SCG); or the same data is transmitted to lower layers (or RLC layers) located at the MCG and the SCG; or a PDCP entity transmits the same PDCP PDU to multiple associated lower-layer entities (or RLC entities). In a carrier aggregation or single-connection mode, a PDCP entity transmits the same PDCP PDU to multiple RLC entities (or referred to as lower-layer entities) and/or logical channels, so as to transmit the PDCP PDU to a receiving end through different carriers (also referred to as serving cells); the PDCP entity at the receiving end is responsible for detecting and deleting duplicate PDCP PDUs or SDUs.

Packet Duplication Bearer: a DRB or SRB that supports packet duplication function in a carrier aggregation or single-connection mode. The DRB or SRB is associated with one PDCP entity, one or a plurality of RLC entities, multiple logical channels, and one or a plurality of MAC entities; a PDCP entity of a transmission end transmits a duplicate or the same PDCP PDU to the one or a plurality of RLC entities and/or multiple logical channels, so as to transmit the duplicate or the same PDCP PDU to a receiving end through different carriers; and a PDCP entity of the receiving end removes the duplicate PDCP PDU or SDU received from the lower-layer entities.

Packet Duplication Split Bearer: a multi-connection data transmission mode or DRB or SRB, which is a split DRB or SRB that supports packet duplication function. In the transmission mode, the same data (or the same PDCP PDU) is transmitted on multiple wireless protocols of the split DRB or SRB, including a packet duplication MCG split DRB, a packet duplication SCG split DRB, a packet duplication MCG split SRB, and a packet duplication SCG split SRB. If it is the packet duplication MCG split DRB or SRB, the PDCP entity located at the master base station or the MCG is responsible for packet duplication and/or packet deduplication; if it is the packet duplication SCG split DRB or SRB, the PDCP entity located at the secondary base station or SCG is responsible for packet duplication and/or packet deduplication.

pdcp-Config Information Element: It includes configurable PDCP parameters of DRBs;

rlc-Config Information Element: It includes configuration information of RLC entities corresponding to SRBs and DRBs;

logicalChannelIdentity Information Element: A logical channel identity. logicalChannelConfig Information Element: It includes parameters used to configure a logical channel.

logicalChannelGroup Information Element: A logical channel group identity, used for mapping a logical channel to a logical channel group for reporting a BSR.

FIG. 1 is a schematic diagram illustrating downlink transmission of a packet duplication MCG split DRB between a base station and user equipment (UE). It should be understood that uplink transmission of the packet duplication MCG split DRB between the base station and the UE can adopt the same protocol architecture, except that data is transmitted from the UE to the base station, namely, the arrows in FIG. 1 are reversed.

As shown in FIG. 1, for example, a Packet Data Convergence Protocol Data Unit (PDCP PDU) is transmitted on multiple wireless protocols (corresponding to multiple RLC entities associated with the same PDCP entity) of the split DRB by using resources of an MeNB and an SeNB. In a PDCP PDU packet duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB.

Figure 2:
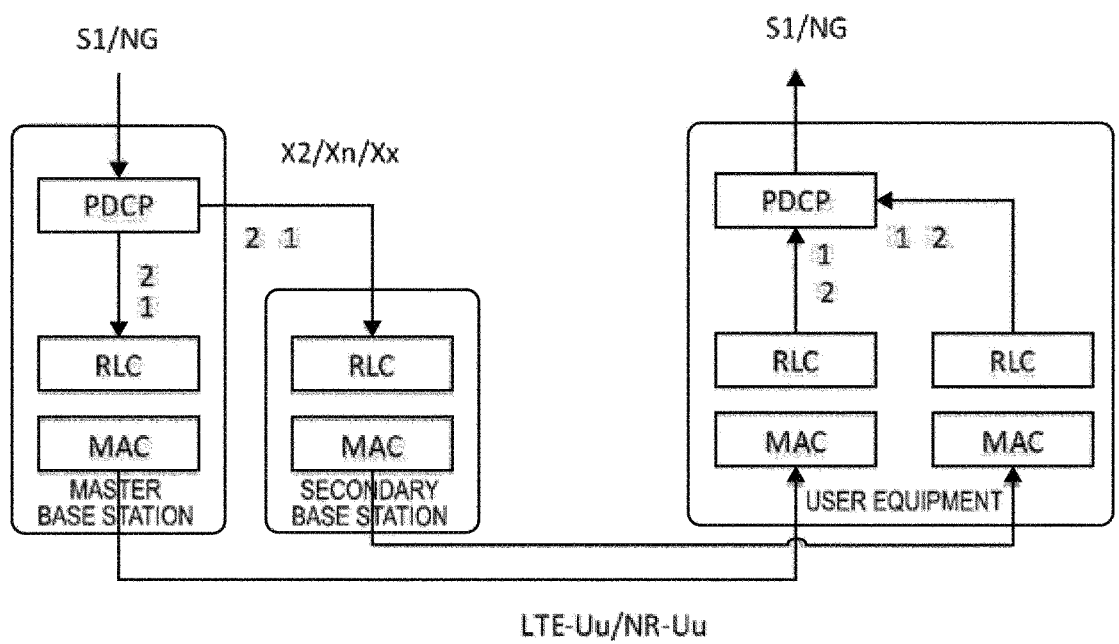
FIG. 2 is a schematic diagram of data transmission of a packet duplication SCG split DRB according to an embodiment of the present application.

FIG. 2 is a schematic diagram illustrating downlink transmission of a packet duplication SCG split DRB between a base station and user equipment (UE). It should be understood that uplink transmission of the packet duplication SCG split DRB between the base station and the UE can adopt the same protocol architecture, except that data is transmitted from the UE to the base station, namely, the arrows in FIG. 2 are reversed.

As shown in FIG. 2, for example, a Packet Data Convergence Protocol Data Unit (PDCP PDU) is transmitted on multiple wireless protocols (corresponding to multiple RLC entities associated with the same PDCP entity) of the split DRB by using resources of an MeNB and an SeNB. In a PDCP PDU packet duplication multi-connection mode, each PDCP PDU is transmitted to a receiving party through multiple RLC entities. An interface between the MeNB and the SeNB may be denoted as Xn or Xx or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB.

The following embodiments are described by taking the case where a data packet (also referred to as a packet) PDCP PDU or SDU is repeatedly transmitted twice (i.e., one PDCP entity is associated with two RLC entities and/or two logical channels) as an example. However, the technical solution of the present disclosure is not limited to scenarios in which a packet PDCP PDU or SDU is repeatedly transmitted twice. After reading the following description, a person skilled in the art can extend the technical solution to scenarios where repeated transmission is performed for multiple times (for example, one PDCP entity is associated with multiple RLC entities and/or multiple logical channels).

Figure 3A:
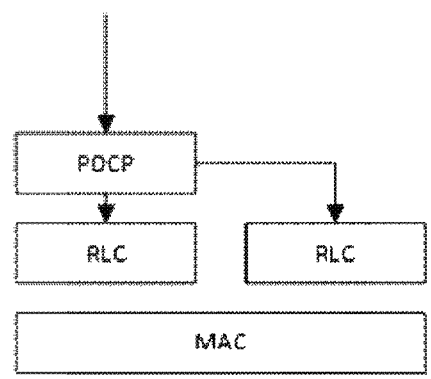
FIG. 3A and FIG. 3B are schematic diagrams illustrating a protocol architecture in user equipment according to an embodiment of the present application.
Figure 3B:
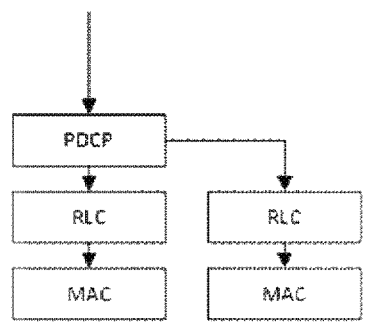

FIG. 3A and FIG. 3B are schematic diagrams showing a protocol architecture in user equipment UE in a carrier aggregation scenario. Specifically, in the schematic diagram shown in FIG. 3A, one DRB is mapped to one PDCP entity, two RLC entities and two logical channels, and one MAC entity; in the schematic diagram shown in FIG. 3B, one DRB is mapped to one PDCP entity, two RLC entities and two logical channels, and two MAC entities.

Figure 4A:
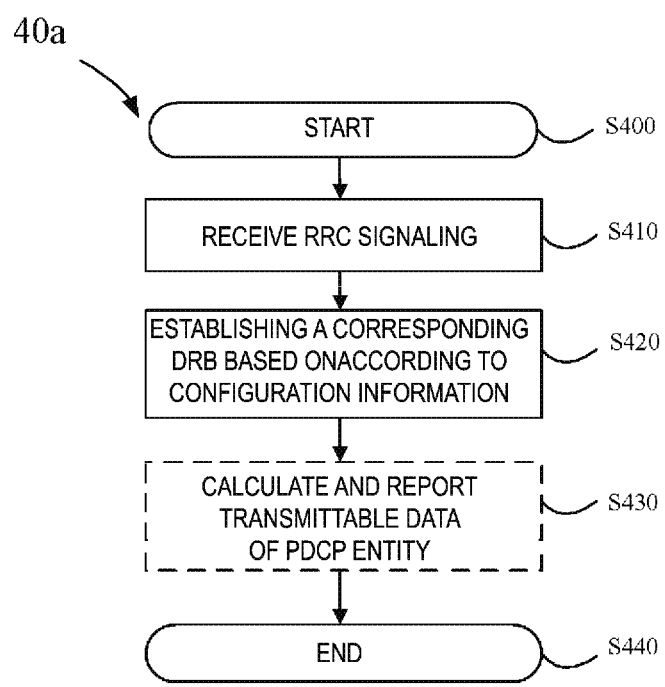
FIG. 4A is a flowchart of a method executed by user equipment according to an embodiment of the present application.

FIG. 4A is a flowchart of a method 40a executed by user equipment according to an embodiment of the present application. The method 40a starts from step S400.

In step S410, the user equipment receives RRC signaling (for example, an RRC connection reconfiguration message) from a base station, where the RRC signaling includes configuration information used for configuring, for the user equipment, a DRB supporting packet duplication. For example, the DRB can be a packet duplication DRB, a packet duplication MCG split DRB, or a packet duplication SCG split DRB.

In step S420, the user equipment establishes a corresponding DRB according to the received DRB configuration information.

Optionally, in step S430, the user equipment calculates transmittable data of a PDCP entity for a logical channel corresponding to the established DRB.

Finally, the method 40a ends at step S440.

Figure 4B:
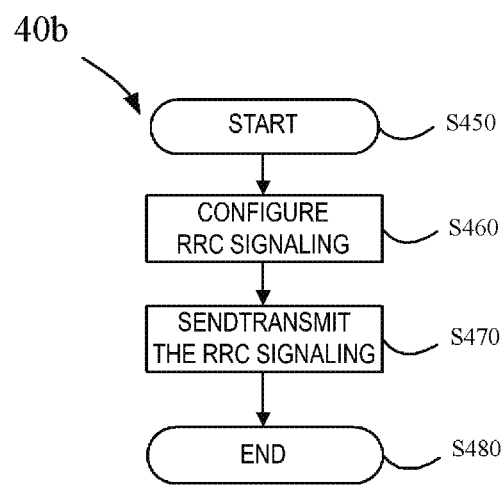
FIG. 4B is a flowchart of a method executed by a base station according to an embodiment of the present application.

FIG. 4B is a flowchart of a method 40b executed by a base station according to an embodiment of the present application. The method 40b starts at step S450.

In step S460, the base station configures radio resource control RRC signaling (e.g., RRC connection reconfiguration message), and the RRC signaling includes configuration information for configuring, for user equipment UE, a data radio bearer DRB supporting packet duplication. For example, the DRB can be a packet duplication DRB, a packet duplication MCG split DRB, or a packet duplication SCG split DRB.

In step S470, the base station transmits the RRC signaling to the user equipment.

Finally, the method 40b ends at step S480.

In the following description, the implementation of the steps of the methods shown in FIG. 4A and FIG. 4B is described by using specific examples.

The Base Station Configures a Packet Duplication DRB for the User Equipment

The user equipment receives RRC signaling (e.g., an RRC connection reconfiguration message) from the base station, where the RRC signaling includes configuration information for configuring the packet duplication DRB for the user equipment.

Specifically, in one embodiment, two logical channel identities are configured for the packet duplication DRB in the RRC signaling. An example of packet duplication DRB configuration information is given below:

```
DRB-ToAddMod ::=      SEQUENCE {
    eps-BearerIdentity              INTEGER (0..15)        OPTIONAL,      -- Cond
DRB-Setup
    drb-Identity                    DRB-Identity,
    pdcp-Config                     PDCP-Config            OPTIONAL,      -- Cond PDCP
    rlc-Config                      RLC-Config             OPTIONAL,      -- Cond SetupM
    logicalChannelIdentity          INTEGER (3..10)        OPTIONAL,      -- Cond
DRB-SetupM
    logicalChannelIdentity          INTEGER (3..10)        OPTIONAL,      -- Cond
DRB-SetupM
    logicalChannelConfig            LogicalChannelConfig   OPTIONAL,      -- Cond SetupM
    ...,
    [[  drb-TypeChange-r12              ENUMERATED {toMCG}     OPTIONAL,      -- Need OP
        rlc-Config-V1250                RLC-Config-v1250       OPTIONAL,      -- Need ON
    ]],
    [[  rlc-Config-v1310                RLC-Config-v1310       OPTIONAL,      -- Need ON
        drb-TypeLWA-r13                 BOOLEAN                OPTIONAL,      -- Need ON
        drb-TypeLWIP-r13                ENUMERATED {lwip, lwip-DL-Only,
                                        lwip-UL-only, eutran}  OPTIONAL       -- Need
ON
    ]]
}
```

In another embodiment, the RRC signaling configures a logical channel identity for the packet duplication DRB, and the RRC signaling further includes a packet duplication DRB indicator. The indicator is used to indicate that the DRB is a packet duplication DRB or a DRB supporting the packet duplication function, or the corresponding PDCP entity supports two or a plurality of repeated transmissions of a PDCP PDU, or the corresponding PDCP entity supports the packet duplication function. For example, when a value of the indicator is "1" or "TRUE" or "Setup" or the indicator is present, it indicates that the corresponding DRB is a packet duplication DRB or a DRB supporting the packet duplication function, the corresponding PDCP entity corresponding to the DRB supports two or a plurality of repeated transmissions of each PDCP PDU, or the corresponding PDCP entity supports the packet duplication function; when a value of the indicator is "0" or "FALSE" or "Release" or the indicator is absent, it indicates that the corresponding DRB is not a packet duplication DRB or is a DRB that does not support the packet duplication function, the corresponding PDCP entity does not support repeated transmission of a PDCP PDU, or the corresponding PDCP entity does not support the packet duplication function. An example of the packet duplication DRB configuration information is given below:

```
DRB-ToAddMod ::=    SEQUENCE {
    duplicateDrb                    ENUMERATED {TRUE}
    eps-BearerIdentity              INTEGER (0..15),         OPTIONAL,        -- Cond
DRB-Setup
    drb-Identity                    DRB-Identity,
    pdcp-Config                     PDCP-Config              OPTIONAL,        -- Cond PDCP
    rlc-Config                      RLC-Config               OPTIONAL,        -- Cond SetupM
    logicalChannelIdentity          INTEGER (3..10)          OPTIONAL,        -- Cond
DRB-SetupM
    logicalChannelConfig            LogicalChannelConfig     OPTIONAL,        -- Cond SetupM
    ...,
    [[  drb-TypeChange-r12              ENUMERATED {toMCG}     OPTIONAL,        -- Need OP
        rlc-Config-v1250                RLC-Config-v1250       OPTIONAL,        -- Need ON
    ]],
    [[  rlc-Config-v1310                RLC-Config-v1310       OPTIONAL,        -- Need ON
        drb-TypeLWA-r13                 BOOLEAN                OPTIONAL,        -- Need ON
        drb-TypeLWIP-r13                ENUMERATED {lwip, lwip-DL-Only,
                                          lwip-UL-only, eutran}    OPTIONAL              -- Need
ON
    ]]
}
```

The User Equipment Establishes a Packet Duplication DRB According to the Received Configuration Information The user equipment establishes a corresponding DRB according to the DRB configuration information carried in the RRC signaling.

In one embodiment, the DRB establishment procedure may comprise the following operations:

Establishing a PDCP entity and configuring the PDCP entity according to an MCG security configuration and pdcp-Config (if the packet duplication SCG DRB is established, the PDCP entity is configured according to an SCG security configuration); optionally, the RRC signaling also includes configuring the PDCP entity to activate the packet duplication function (the activating the packet duplication function described in the present disclosure may also be expressed as configuring the PDCP entity to transmit the same PDCP PDU to multiple associated lower-layer entities or RLC entities); or configuring the PDCP entity to deactivate the packet duplication function. If the packet duplication function of the PDCP entity is deactivated, the PDCP entity transmits the PDCP PDU to one of the lower-layer entities, namely, each PDCP PDU is not repeatedly transmitted. For example, the PDCP PDU is transmitted only through an RLC entity associated with the logical channel with a smaller or smallest (or larger or largest) logical channel identity. When an instruction to deactivate the PDCP packet duplication function is received from the upper layer or the MAC layer or the lower layer or the like, the PDCP PDU is transmitted only through the RLC entity associated with the logical channel with a smaller, smallest, larger, or largest logical channel identity.

Establishing one or two MCG RLC entities according to received rlc-Config (if a packet duplication SCG DRB is established, then one MCG RLC and one SCG RLC are established). If only one rlc-Config configuration is received, the two MCG RLC entities employ the same rlc-Config configuration. Otherwise, the corresponding RLC entities are respectively configured according to the received two rlc-Configs.

Establishing two MCG DTCH logical channels based on the received two logical channel identities (denoted as logicalChannelIdentity) and one or two logical channel configurations (denoted as logicalChannelConfig) (if a packet duplication SCG DRB is established, then one MCG DTCH and one SCG DTCH are established). The two MCG DTCH logical channels have different logical channel identities, but may employ the same or different logical channel configurations. If two logical channel configurations are received, different logical channel configurations are used for the two MCG DTCHs; otherwise, the two MCG DTCHs employ the same logical channel configuration.

In another embodiment, the DRB establishment procedure may comprise the following operations:

Establishing a PDCP entity and configuring the PDCP entity according to an MCG security configuration and pdcp-Config (if the packet duplication SCG DRB is established, the PDCP entity is configured according to an SCG security configuration); optionally, if the RRC signaling includes a packet duplication DRB indicator, configuring the PDCP entity to activate the packet duplication function; or if the RRC signaling includes a packet duplication DRB indicator, configuring the PDCP entity to deactivate the packet duplication function. If the packet duplication function of the PDCP entity is deactivated, the PDCP entity transmits the PDCP PDU to one lower-layer entity, namely, each PDCP PDU is not repeatedly transmitted. For example, the PDCP PDU is transmitted only through the RLC entity associated with the logical channel with a smaller (or larger) logical channel identity. When an instruction to deactivate the PDCP packet duplication function is received from the upper layer or the MAC layer or the lower layer or the like, the PDCP PDU is transmitted only through the RLC entity associated with the logical channel with a small, smallest, larger, or largest logical channel identity.

If the packet duplication DRB indicator is included, establishing one or two MCG RLC entities according to received rlc-Config (if a packet duplication SCG DRB is established, then one MCG RLC and one SCG RLC are established). If only one rlc-Config configuration is received, the two MCG RLC entities employ the same rlc-Config configuration. Otherwise, the corresponding RLC entities are respectively configured according to the received two rlc-Configs.

If the packet duplication DRB indicator is included, two MCG DTCH logical channels are established according to the received logical channel identities (denoted as logicalChannelIdentity) and logical channel configuration (denoted as logicalChannelConfig) (if the packet duplication SCG DRB is established, then one MCG DTCH and one SCG DTCH are established). The logical channel identities of the two MCG DTCH logical channels are different. The identity of one logical channel is carried in the RRC signaling, and the identity of the other logical channel can be obtained according to a predefined rule. The rule comprises that the identity of the other logical channel is the logical channel identity carried in the RRC signaling plus an offset, and the offset may be a predefined or default value. If more than two logical channels are configured for one DRB, the identities of the other logical channels may be sequentially the logical channel identity configured in the RRC signaling plus 1×, 2×, 3× . . . offset. Preferably, the offset is a maximum value MAX_LogicalChannel_Identity of a logical channel identity supported (or configurable or defined) by the system. For example, if the logical channel identity of the packet duplication DRB configured in the RRC signaling is 5, and the maximum logical channel identity defined by the system is 10, then the identity of one logical channel corresponding to the packet duplication DRB is 5, the other logical channel identity is 15, and the third logical channel identity is 25; the sequence continues in this order. The two MCG DTCH logical channels may employ the same or different logical channel configurations; if two logical channel configurations are received, the two MCG DTCHs employ different logical channels; otherwise, the two MCG DTCHs employ the same logical channel configuration.

In this embodiment, the MAC layer transmits both data (or packet or RLC PDU) from a logical channel whose logical channel identity is "i" and data from a logical channel whose logical channel identity is "i+MAX_LogicalChannel_Identity" (or a logical channel whose logical channel identity is j where j satisfies j mod MAX_LogicalChannel_Identity=i) on different carriers.

In this embodiment, if one DRB is configured with multiple logical channels, the RRC signaling for configuring the DRB may also include an indicator. The indicator is used to indicate the number of logical channels and/or the number of RLC entities corresponding to the DRB. The user equipment establishes the corresponding number of RLC entities and/or logical channels according to the indicator and sets corresponding logical channel identities according to the method described in the foregoing embodiment.

The User Equipment Calculates Transmittable Data of PDCP

For the packet duplication DRB, packet duplication split DRB, packet duplication SRB, or packet duplication split SRB, transmittable data of the PDCP entity can be defined as follows:

1, PDCP control PDUs;
2, The PDCP SDUs, where the SDUs corresponding to the PDUs have not been submitted to the lower layer (or RLC layer), and the lower layer may be the lower layer corresponding to the logical channel. For example, the transmittable data of the PDCP entity may comprise: SDUs that have not been processed by the PDCP and PDUs that have been processed by the PDCP.

In the Carrier Aggregation Scenario, the User Equipment Reports Transmittable Data of PDCP In one embodiment, for a packet duplication DRB or a packet duplication SRB, when a MAC entity triggers a BSR and calculates a buffer size, the transmittable data of the PDCP entity is indicated to two logical channels associated with a packet duplication DRB or a packet duplication SRB. Further, in the case where the packet duplication function of the PDCP entity is activated, the transmittable data of the PDCP entity is indicated to the two logical channels associated with the packet duplication DRB or the packet duplication SRB only when the MAC entity triggers the BSR and calculates the buffer size; otherwise, the transmittable data of the PDCP entity is indicated only to the logical channel with the smaller, smallest, larger, or largest logical channel identities of the two logical channels associated with the packet duplication DRB or the packet duplication SRB.

In another embodiment, the logical channel group identity corresponding to the packet duplication DRB or the packet duplication SRB is predefined. When the user equipment establishes a DTCH of the packet duplication DRB or the packet duplication SRB, the predefined logical channel group identity is associated with (or applied to) the established one or two logical channel DTCHs of the packet duplication DRB or the packet duplication SRB. If the logical channel group identity is associated with one logical channel DTCH, the logical channel group identity can be associated with the smaller, smallest, larger, or largest logical channel identity. Optionally, the predefined logical channel group identity is applied only to the packet duplication DRB.

In yet another embodiment, the logical channel group identity of the packet duplication DRB or the packet duplication SRB is included in the RRC signaling for configuring the packet duplication DRB or the packet duplication SRB. When the user equipment establishes a DTCH of the packet duplication DRB or the packet duplication SRB, the logical channel group identity is associated with (or applied to) the established one or two logical channel DTCHs of the packet duplication DRB or the packet duplication SRB. If the logical channel group identity is associated with one logical channel DTCH, the logical channel group identity can be associated with the logical channel DTCH with the smaller, smallest, larger, or largest logical channel identity. It is also possible to configure two different logical channel group identities for two DTCHs of the packet duplication DRB or the packet duplication SRB. Optionally, the same logical channel group identity is allocated for the packet duplication DRB, and different logical channel identities are allocated for the packet duplication DRB and the DRB that does not support the packet duplication.

User Equipment Reports Transmittable Data of PDCP in a Multi-Connection Scenario The user equipment receives RRC signaling from the base station, such as an RRC connection reconfiguration message. The RRC signaling is used to configure the packet duplication split DRB (including the MCG split DRB and the SCG split DRB) or the packet duplication split SRB (including the MCG split SRB and the SCG split SRB) for the UE.

Then, the user equipment establishes the packet duplication split DRB or the packet duplication split SRB according to the received RRC signaling.

For the configured packet duplication split DRB or packet duplication split SRB, the transmittable data in the PDCP entity is indicated to the MAC entity configured for the SCG and the MAC entity configured for the MCG. Further, only in the case where the packet duplication function of the PDCP entity is activated, the transmittable data in the PDCP entity is indicated to the MAC entity configured for the SCG and the MAC entity configured for the MCG.

Figure 5A:
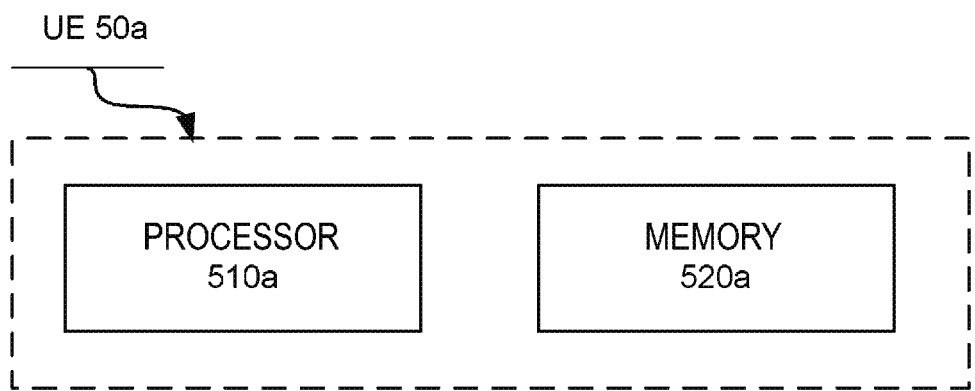
FIG. 5A is a block diagram of user equipment according to an embodiment of the present application.

FIG. 5A is a block diagram of a user equipment 50*a* according to an embodiment of the present application. As shown in FIG. 5A, the user equipment 50*a* comprises a processor 510*a* and a memory 520*a*. The processor 510*a* may, for example, include a microprocessor, a microcontroller, an embedded processor, or the like. The memory 520*a* may, for example, comprise a volatile memory (for example, a random access memory (RAM)), a hard disk drive (HDD), a non-volatile memory (for example, a flash memory), or other memories. Program instructions are stored on the memory 520*a*. The instructions, when processed by the processor 510*a*, can perform the above method executed by user equipment described in detail in the present disclosure.

Figure 5B:
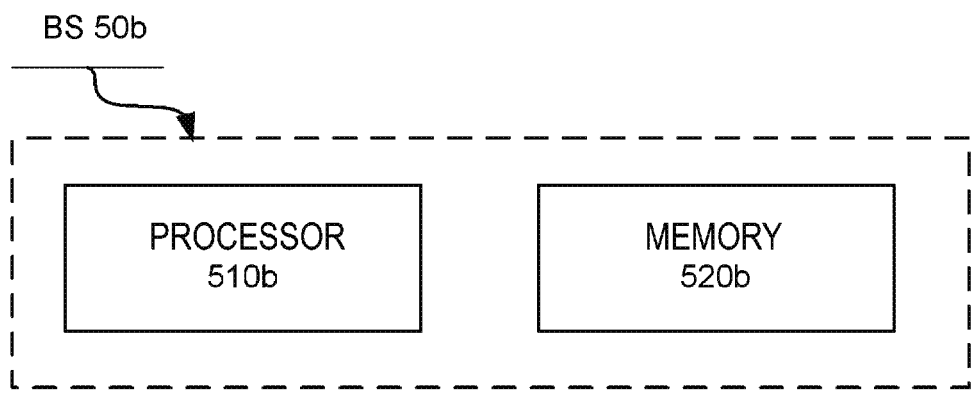
FIG. 5B is a block diagram of a base station according to an embodiment of the present application.

FIG. 5B is a block diagram of a base station (BS) 50*b* according to an embodiment of the present application. As shown in FIG. 5B, the BS 50*b* comprises a processor 510*b* and a memory 520*b*. The processor 510*b* may, for example, comprise a microprocessor, a microcontroller, an embedded processor, or the like. The memory 520*b* may, for example, comprise a volatile memory (for example, a random access memory (RAM)), a hard disk drive (HDD), a non-volatile memory (for example, a flash memory), or other memories. Program instructions are stored on the memory 520*b*. The instructions, when processed by the processor 510*b*, can execute the above method executed by a base station described in detail in the present disclosure.

Additionally, the program for implementing the functions of the embodiments of the present disclosure may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by a user equipment (UE), comprising:
   receiving a Radio Resource Control (RRC) message used to configure a Data Radio Bearer (DRB) with duplication;
   if the duplication is configured to be activated, a Packet Data Convergence Protocol (PDCP) entity of the DRB submits PDCP Protocol Data Units (PDUs) to multiple Radio Link Control (RLC) entities associated to the DRB;
   else if the duplication is configured to be deactivated, the PDCP entity of the DRB submits PDCP PDUs to one of the RLC entities associated to the DRB; and
   indicating, in response to the duplication being configured to be activated, PDCP transmittable data to multiple Medium Access Control (MAC) entities associated with the RLC entities of the DRB.

2. The method according to claim 1,
   wherein the PDCP transmittable data includes (i) the PDCP SDUs that have not been processed by the PDCP entity, (ii) the PDCP PDUs that have been processed by the PDCP entity but have not been submitted to lower layer, and (iii) the PDCP Control PDUs.

3. A method performed by a base station, comprising:
   transmitting a Radio Resource Control (RRC) message used to configure a Data Radio Bearer (DRB) with duplication;
   if the duplication is configured to be activated, receiving Packet Data Convergence Protocol (PDCP) Protocol Data Units (PDUs) submitted to multiple Radio Link Control (RLC) entities associated to the DRB from a PDCP entity of the DRB of a user equipment (UE);
   else if the duplication is configured to be deactivated, receiving PDCP PDUs submitted to one of the RLC entities associated to the DRB from the PDCP entity of the DRB of the UE; and
   indicating, in response to the duplication being configured to be activated, PDCP transmittable data to multiple Medium Access Control (MAC) entities associated with the RLC entities of the DRB.

4. The method according to claim 3,
   wherein the PDCP transmittable data includes (i) the PDCP SDUs that have not been processed by the PDCP entity, (ii) the PDCP PDUs that have been processed by the PDCP entity but have not been submitted to lower layer, and (iii) the PDCP Control PDUs.

5. A user equipment (UE), comprising:
   a processor; and a memory, the memory having instructions stored thereon, wherein the instructions, when processed by the processor, execute the method comprising:

receiving a Radio Resource Control (RRC) message used to configure a Data Radio Bearer (DRB) with duplication;

if the duplication is configured to be activated, a Packet Data Convergence Protocol (PDCP) entity of the DRB submits PDCP Protocol Data Units (PDUs) to multiple Radio Link Control (RLC) entities associated to the DRB;

else if the duplication is configured to be deactivated, the PDCP entity of the DRB submits PDCP PDUs to one of the multiple RLC entities associated to the DRB; and indicating, in response to the duplication being configured to be activated, PDCP transmittable data to multiple Medium Access Control (MAC) entities associated with the RLC entities of the DRB.

6. The UE according to claim 5,
wherein the PDCP transmittable data includes (i) the PDCP SDUs that have not been processed by the PDCP entity, (ii) the PDCP PDUs that have been processed by the PDCP entity but have not been submitted to lower layer, and (iii) the PDCP Control PDUs.

7. A base station, comprising:
a processor; and
a memory, the memory having instructions stored thereon, wherein the instructions, when processed by the processor, execute the method comprising:

transmitting a Radio Resource Control (RRC) message used to configure a Data Radio Bearer (DRB) with duplication;

if the duplication is configured to be activated, receiving Packet Data Convergence Protocol (PDCP) Protocol Data Units (PDUs) submitted to multiple Radio Link Control (RLC) entities associated to the DRB from a PDCP entity of the DRB of a user equipment (UE);

else if the duplication is configured to be deactivated, receiving PDCP PDUs submitted to one of the multiple RLC entities associated to the DRB from the PDCP entity of the DRB of the UE; and indicating, in response to the duplication being configured to be activated, PDCP transmittable data to multiple Medium Access Control (MAC) entities associated with the RLC entities of the DRB.

8. The base station according to claim 7, wherein the method further comprises:
wherein the PDCP transmittable data includes (i) the PDCP SDUs that have not been processed by the PDCP entity, (ii) the PDCP PDUs that have been processed by the PDCP entity but have not been submitted to lower layer, and (iii) the PDCP Control PDUs.

* * * * *